United States Patent [19]

Baggetta

[11] Patent Number: 4,745,883
[45] Date of Patent: May 24, 1988

[54] SAFETY TETHER DEVICE

[76] Inventor: Colleen S. Baggetta, 2839 Andiron La., Vienna, Va. 22180

[21] Appl. No.: 901,193

[22] Filed: Aug. 28, 1986

[51] Int. Cl.$^4$ ............................................. A62B 35/00
[52] U.S. Cl. .......................................... 119/96; 2/323
[58] Field of Search ....................... 119/96; 2/170, 237, 2/DIG. 11, 323, 310, 181

[56] References Cited

U.S. PATENT DOCUMENTS

| | | | |
|---|---|---|---|
| 478,076 | 7/1892 | Asten | 2/323 |
| 1,296,051 | 3/1919 | Curtis | 2/181 X |
| 2,650,590 | 9/1953 | Moore et al. | 119/96 |
| 2,994,300 | 7/1958 | Grahling . | |
| 3,104,650 | 7/1961 | Grahling . | |
| 4,499,741 | 2/1985 | Harris | 2/181 X |
| 4,638,764 | 1/1987 | Anderson | 119/96 |

Primary Examiner—David A. Scherbel
Assistant Examiner—Creighton Smith
Attorney, Agent, or Firm—Parkhurst & Oliff

[57] ABSTRACT

The present invention relates to a tether device for restricting the range of movement of a child relative to an older person. The tether device comprises a unitary stretch member having a pair of longitudinally extending sides, a pair of transversely extending sides, and a pair of end portions proximate each of said transversely extending sides. The unitary stretch member is stretchable between a relaxed state and taut state, such that the length of said unitary stretch member in the taut state is greater than the length of the unitary stretch member in the relaxed state. A first transversely extending side of said unitary stretch meber is secured to a first end portion of said stretch member to form a first loop a second transversely extending side of said unitary stretch member is secured to a second end portion of said stretch member to form a second loop. The first and second loops constitute first and second elastic wrist bands, respectively. An eleastic tether portion is provided between the first and second eleastic wrist bands. Preferred embodiments of the foregoing device are also disclosed.

9 Claims, 1 Drawing Sheet

SAFETY TETHER DEVICE

BACKGROUND OF THE INVENTION

This invention relates to a safety tether device by means of which an older person may be tethered to a child. The safety tether device allows an older person (such as an adult) to maintain control over the child while allowing the child a feeling of freedom.

Various types of restraining devices have been devised for controlling and limiting the travel of children in relation to supervising adults. Essentially such devices comprise a cord, strap or chain, one end of which is connected to the child as by a band or harness, and the other end of which is held by or fastened to the person of the adult. U.S. Pat. Nos. 2,994,300 and 3,104,650 provide examples of known tether devices.

While the known tether devices are effective at tethering a child to an older person, they have proven impractical for a number of reasons.

First, the tether arrangements are cumbersome and complicated, frequently requiring buckling or strapping, and including a coiled tether element which may become tangled. Further, the prior devices are difficult to attach and remove, thus discouraging use.

Second, known tether devices are unsafe, uncomfortable, and unappealing. Specifically, known arrangements generally include leash-like, inextensible wrist bands which include sharp metal buckle pieces and are capable of being over-tightened. Moreover, the leash-like wrist band is generally made of an inextensible material which is uncomfortable to the wearer because, among other things, it rubs and chafes the skin. Further, prior art leash-like devices are often unappealing to both adults, who view them as inhumane, and children who resist them as leash-like.

Third, while some elasticity is desirable for compactness, known tethers often stretch to such an extent that it is difficult to maintain effective control of the child.

Fourth, known tether devices require several different components including for example a leash-like wrist band, a buckle, a cord and hooks some of which are unsafe and all of which increase the cost of construction.

Finally, known tether devices contain components which are not readily machine washable or dryable and cannot be separated from the remainder of the tether device. Accordingly, the tether device is not readily machine washable and dryable. This problem occurs, for example, when the tether device contains leather, plastic,. or metal components. Since the wrist bands of the tether device inevitably become soiled, known tether devices must be hand washed and air-dryed.

SUMMARY OF THE INVENTION

It is the object of the present invention to overcome the above-mentioned shortcomings by providing a simple safety device for tethering a child to an adult which is safe, very inexpensive, easily attachable and detachable, constructed of only machine washable and dryable materials, compact, and appealing to both adults and children.

These objects are achieved in accordance with the present invention by providing a safety tether device which includes a unitary stretch member having length, width, and thickness. The unitary stretch member includes a pair of longitudinally extending sides, a pair of transversely extending sides, and a pair of end portions proximate each of said transversely extending sides. The unitary stretch member is stretchable between a relaxed state and a taut state, such that the length of said unitary stretch member in the taut state is greater than the length of the unitary stretch member in the relaxed state.

A first transversely extending side of said unitary stretch member is secured to a first end portion of said stretch member to form a first loop, a second transversely extending side of said unitary stretch member is secured to a second end portion of said stretch member to form a second loop. The first and second loops constitute first and second elastic wrist bands, respectively. The first wrist band is worn by the older person and the second wrist band is worn by the child. A tether portion is provided between the elastic wrist bands to limit the travel of the child relative to the older person.

In accordance with preferred embodiments of the present invention the first wrist band may be made larger than the second wrist band, and the wrist bands are incapable of being placed around the neck of a small child.

In accordance with other preferred embodiments of the present invention, the stretch member is made only of machine washable and dryable materials and comprises an outer cloth layer, an inner elastic layer and thread means securing the cloth layer to the elastic layer. Moreover, when the elastic layer is in the relaxed state the cloth layer is gathered about the elastic layer and when the elastic layer is in the taut state, the cloth layer is taut. Additionally, the stretch member may be in the form of a long, flat, thin member so as to inhibit tangling of the tether portion of the assembled tether device.

BRIEF DESCRIPTION OF THE DRAWINGS

Further details are explained below with the help of the examples illustrated in the attached drawings in which.

DESCRIPTION OF THE PREFERRED EMBODIMENT

Figure 1:
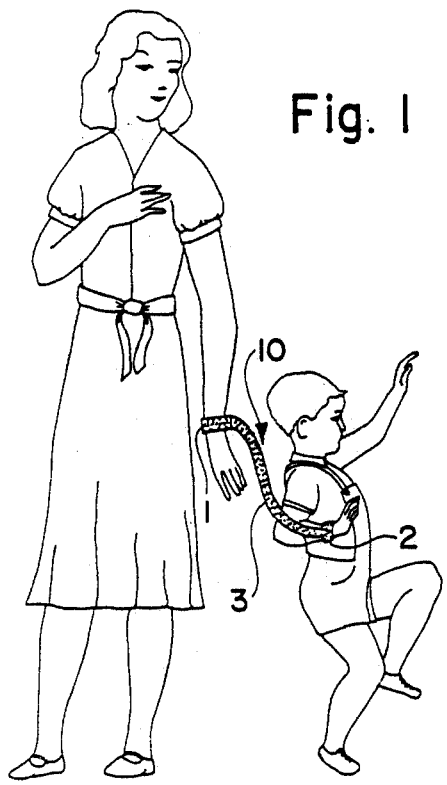
FIG. 1 illustrates the use of the safety tether device of the present invention.
Figure 2:
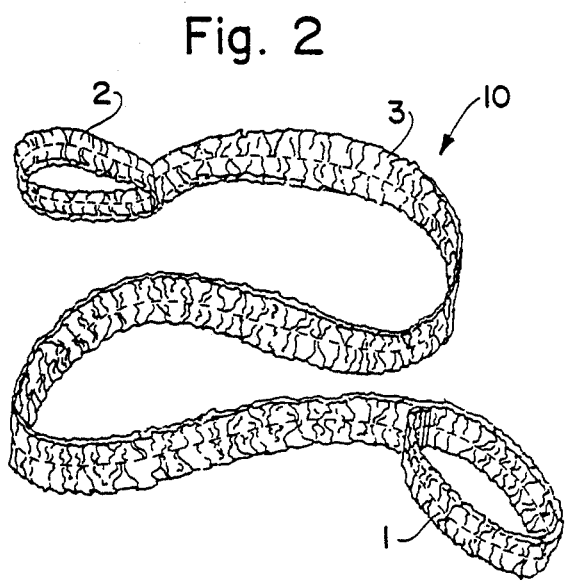
FIG. 2 illustrates the safety tether device of the present invention in a relaxed state.

As shown in FIGS. 1 and 2, and in accordance with an important feature of the present invention, the safety tether device comprises a large elastic wrist band 1, an elastic tether portion 3, and a small elastic wrist band 2 which are constructed of a unitary stretch member 10.

The unitary stretch member 10 is somewhat elastic. In other words by applying opposed forces to the transversely extending ends of the unitary stretch member 10, the unitary stretch member 10 is converted from a relaxed or slack state to a taut or no-slack state. In the taut state the length of the unitary stretch member is greater than the length of the unitary stretch member in the relaxed state. In accordance with an important feature of the present invention, the stretch ratio, i.e. the ratio of the taut length to relaxed length of the stretch element is between 1.25 and 1.90. Preferably, the stretch ratio is about 1.5, so that the older person can maintain effective control of the child. The use of a flat thin unitary stretch member 10, inhibits tangling of the tether portion 3 of the assembled tether device.

Figure 4:
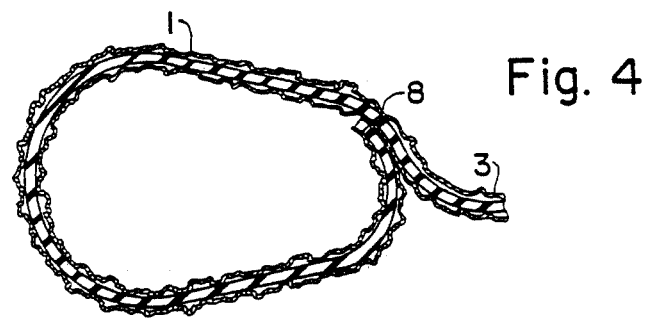
FIG. 4 illustrates the connection of a transversely extending end of the unitary stretch member to an end portion of the unitary stretch member at one end of the safety tether device.

As shown in FIGS. 1, 2 and 4 the unitary stretch member 10 is a long, flat, thin member. Preferably, the length of the stretch member is at least 10 times the width of the stretch member; and the width of the stretch member is at least 3 times the thickness of the stretch member. This relationship of length, width, and thickness is satisfied regardless of the state of the unitary stretch member. In other words, the relationship holds true in the taut state as well as in the relaxed state and any state in between. The stretch member 10 has longitudinally extending sides, transversely extending sides and end portions proximate the transversely extending sides.

As shown in FIG. 2, a first transversely extending end of the stretch member 10 is secured to a first end portion of the stretch member to form a first loop 1. Similarly, a second transverse end of the stretch member 10 is secured to a second end portion of the stretch member 10 to form a second loop 2. The first and second loops constitute first and second elastic wrist bands 1 and 2, respectively. The large elastic wrist band 1 is connected to the small elastic wrist band 2 by the elastic tether portion 3.

As shown in FIG. 1, large elastic wrist band 1 is designed for attachment to an older person or adult, as by encirclement of the wrist. Small elastic wrist band 2 is designed for attachment to the child, also by encirclement of the wrist. The first elastic wristband 1 is preferably larger than the second wrist band 2 to accomodate the normal difference in wrist size between an adult and a child. While each of the wrist bands 1, 2 are somewhat extensible so as to enable firm attachment of the wrist band to the wearer's wrist, their extensibility is limited so as to prevent the possibility of placing the wrist band about a small child's neck. In particular, the ratio of the length of wrist bands 1, 2 in a relaxed, unstretched state and the length of the wrist bands in a taut, stretched state is between 1:1.25 and 1:1.90. In other words the stretch ratio of the wrist bands is the range 1.25–1.90.

The cross-sectional construction of the unitary stretch member will now be explained in connection with FIG. 3.

Figure 3:
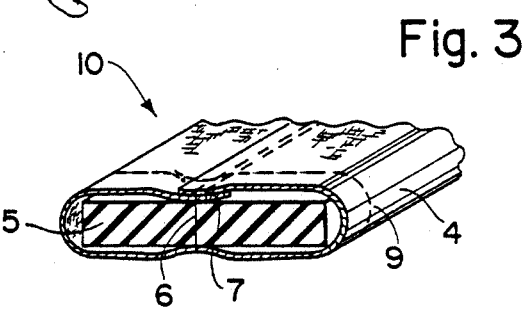
FIG. 3 shows a perspective view of a transverse section of the unitary stretch member when the safety tether device is in the taught state.

As shown in FIG. 3, the unitary stretch member comprises a cloth outer layer 4, an elastic inner layer 5 and thread means 6 securing the cloth outer layer to the elastic inner layer. When the stretch member 10 is in the taut state as shown in FIG. 3, the cloth layer 4 is taut. However, when the stretch member 10 is in the relaxed state, the cloth layer 4 is gathered about the elastic layer 5, as shown in FIG. 2. As understood by those skilled in the art, the gathering of the cloth layer 4 in the relaxed state is necessary since the cloth layer 4 is relatively inextensible as compared to the elastic layer 5.

Preferably, the cloth layer, the elastic layer, and the thread means are all machine washable and dryable. As understood by those of skill in the art, machine washable refers to materials which are capable of immersion in water without permanent alteration of their physical properties. For instance, cotton cloth is machine washable, but leather is not. Similarly, machine dryable refers to materials which are capable of withstanding the temperature of a conventional home clothes dryer without permanent substantial alteration of their physical properties and without becoming heated so as to affect other items in the dryer. For instance, cotton cloth is machine dryable, but leather, plastic, and metal are not. Specifically, when exposed to the heat of a conventional home clothes dryer, leather deforms, some plastics melt, and metal becomes so heated as to burn other items in the dryer. While it is recognized that cotton cloth may shrink somewhat when exposed to heat, such shrinkage is insubstantial in regard to the present invention. Further, such shrinkage may be reduced or eliminated by using a cotton blend cloth such as cotton-polyester blend.

Referring again to FIG. 2, it is noted that in the relaxed state the cloth layer 4 has a rumpled appearance. This appearance in the relaxed state is due to the fact that the cloth layer 4 is gathered about the elastic strip 5 in the relaxed condition. As previously noted, gathering of the cloth layer 4 about the elastic strip 5 is necessary to permit extensibility of the stretch member.

The construction of the elastic wrist bands will now be discussed in conjunction with FIG. 4. As shown in FIG. 4, the wrist band is constructed by securing a transversly extending end of the stretch member to an end portion of the stretch member to form a loop which constitutes the wrist band. The small elastic wrist band is constructed in substantially the same manner. Preferably, machine washable and dryable thread means 8 is used to secure the transversely extending ends to the end portions.

The cloth used to form the cloth layer 4 may be any known cloth. However, it may be preferable to use cotton or a cotton blend such as cotton polyester blend for added comfort and to ensure machine washability and dryability. Further, it is desirable to use cloth having an attractive pattern printed thereon so as to improve the appearance and appeal of the safety tether device.

Similarly, the elastic layer 5 may be constructed of any conventional elastic material. However, it is desirable to employ a flexible stretchable fabric made with interwoven strands of an elastic material such as rubber or an imitative synthetic fiber which is machine washable and dryable.

Finally, the thread used in stitching such as shown by reference numerals 6, 7, 8 and 9 can be any conventional thread. However, it is desirable to use clear nylon thread which is strong and virtually invisible.

ILLUSTRATIVE EXAMPLE

While the safety tether device of the present invention can be constructed in a number of ways, the following is a description of a preferred method of assembly.

Step 1—a strip of cloth approximately 36 inches long and 2 inches wide is formed into a cloth tube by securing longitudinally extending side portions of the cloth strip with stitching.

Step 2—an elastic strip approximately 24 inches long and three quarters of an inch wide in the relaxed state is inserted into the cloth tube. The maximum length to which the elastic element may be stretched is approximately 36 inches.

Step 3—the longitudinal ends of the elastic strip are secured to the longitudinal ends of the cloth tube with stitching.

Step 4—the elastic strip is stretched until its length is equal to the length of the cloth tube and the elastic strip and the cloth tube are then stitched along their entire length while being held taut so as to firmly secure the cloth tube to the elastic element thereby forming the unitary stretch member.

Step5—the transverse ends of the stretch member are then folded back and stitched along the width of the stretch member 10 so as to form the elastic wrist bands and, with the remaining portion of the stretch member constituting the tether portion.

What is claimed is:

1. A safety tether device, comprising:
   a unitary stretch member having an inner elastic member and an outer inelastic cloth tube surrounding said inner elastic member and sewn thereto, said inner elastic member having a first length in a relaxed state and stretching to a second length in a taut state greater than the first length in the relaxed state, said inelastic cloth tube being gathered into folds about said elastic member in the relaxed state of the elastic member and unfolded to the second length of the elastic member in the taut state;
   said unitary stretch member having a pair of longitudinally extending sides, a pair of transversely extending sides and a pair of end portions, a first transversely extending side being sewn to a first end portion to form a first closed wrist loop and a second transversely extending side being sewn to a second end portion to form a second closed wrist loop, said first loop being larger than said second loop in the relaxed state; and
   a tether portion defined between said first and second loops, said tether portion and said first and second loops including only machine washable and dryable materials.

2. A safety tether device according to claim 1 wherein said cloth tube comprises cotton.

3. A safety tether device according to claim 1 wherein said cloth tube comprises a cotton-polyester blend.

4. A safety tether device according to claim 1 wherein said elastic member comprises a flexible stretchable fabric made with interwoven strands of an elastic material.

5. A safety tether device according to claim 1 wherein said first loop and said second loop are incapable of fitting over the head of a small child.

6. The tether device of claim 1 wherein a stretch ratio of the second length to the first length is between 1.25 and 1.90.

7. The tether device of claim 6 wherein the stretch ratio is about 1.5.

8. The tether device of claim 1 wherein a ratio of the length of the stretch member to the width of the stretch member is 10 to 1 in both the relaxed and taut states of the elastic member.

9. The tether device of claim 1 wherein a ratio of the width of the stretch member to the thickness of the stretch member is 3 to 1 in both the relaxed and taut states of the elastic member.

* * * * *